(12) United States Patent
Falb et al.

(10) Patent No.: US 9,874,107 B2
(45) Date of Patent: Jan. 23, 2018

(54) WIND TURBINE DIAGNOSTIC DEVICE FOR GENERATOR COMPONENTS

(71) Applicant: SENVION SE, Hamburg (DE)

(72) Inventors: Martin Falb, Kiel (DE); Lars Nietmann, Albersdorf (DE)

(73) Assignee: SENVION SE, Hamburg (DE)

(*) Notice: Subject to any disclaimer, the term of this patent is extended or adjusted under 35 U.S.C. 154(b) by 228 days.

(21) Appl. No.: 14/694,861

(22) Filed: Apr. 23, 2015

(65) Prior Publication Data
US 2015/0308285 A1    Oct. 29, 2015

(30) Foreign Application Priority Data

Apr. 23, 2014 (DE) .................. 10 2014 207 612

(51) Int. Cl.
*F01D 21/00* (2006.01)
*F03D 7/04* (2006.01)
(Continued)

(52) U.S. Cl.
CPC ........... *F01D 21/003* (2013.01); *F01D 15/10* (2013.01); *F03D 7/042* (2013.01); *F03D 7/048* (2013.01);
(Continued)

(58) Field of Classification Search
CPC .......... F03D 17/00; F03D 80/50; F03D 7/042; F03D 7/048; F03D 9/25; F03D 9/257;
(Continued)

(56) References Cited

U.S. PATENT DOCUMENTS 7,160,083 B2 * 1/2007 Pierce ................... F03D 7/0204
  415/118
7,322,794 B2 * 1/2008 LeMieux ........... G05B 23/0283
  415/118
(Continued)

FOREIGN PATENT DOCUMENTS

DE    10 2008 029 839    12/2009
DE    10 2008 049 530    4/2010
DE    10 2011 117 468    5/2013

OTHER PUBLICATIONS

Verbruggen, T.W. (Apr. 2003). "Wind Turbine Operation & Maintenance based on Condition Monitoring," WT_OMEGA Project, Lagerwey the WindMaster, Siemens Nederland and SKF; 39 pages.
(Continued)

*Primary Examiner* — Freddie Kirkland, III
(74) *Attorney, Agent, or Firm* — Morrison & Foerster LLP

(57) ABSTRACT

A wind turbine diagnostic device for diagnosing mechanical damage to generator components of at least one wind turbine, comprising at least one speed sensor for determining a variation over time of the rotational speed of a generator of a wind turbine, the speed sensor having at least one speed signal output for outputting the determined variation over time of the rotational speed, a frequency analysis module and a frequency spectrum signal output for outputting a frequency spectrum, the frequency analysis module determining a frequency spectrum from the determined variation over time of the rotational speed, and a comparator element for comparing a frequency spectrum with a prescribed standard frequency spectrum and for diagnosing mechanical damage to generator components on the basis of the comparison. This increases the possibility of predicting mechanical damage to generator components caused by vibrations.

17 Claims, 4 Drawing Sheets

(51) Int. Cl.
*F01D 15/10* (2006.01)
*G01P 3/00* (2006.01)
*F03D 17/00* (2016.01)
*F03D 9/25* (2016.01)

(52) U.S. Cl.
CPC .............. *F03D 9/25* (2016.05); *F03D 9/257* (2017.02); *F03D 17/00* (2016.05); *G01P 3/00* (2013.01); *F05B 2260/96* (2013.01); *F05B 2270/101* (2013.01); *F05B 2270/111* (2013.01); *F05B 2270/327* (2013.01); *F05B 2270/334* (2013.01); *Y02E 10/723* (2013.01); *Y02E 10/725* (2013.01)

(58) Field of Classification Search
CPC ..... Y02E 10/72; Y02E 10/723; Y02E 10/722; Y02E 10/725; F05B 2240/96; F05B 2260/80; F05B 2270/334; F05B 2270/327
See application file for complete search history.

(56) References Cited

U.S. PATENT DOCUMENTS

| | | | |
|---|---|---|---|
| 7,677,869 B2* | 3/2010 | Martinez De Lizarduy Romo ... | F03D 80/50 416/36 |
| 8,082,115 B2* | 12/2011 | Bechhoefer | F03D 7/047 290/44 |
| 8,442,778 B2* | 5/2013 | Bechhoefer | F03D 7/047 290/44 |
| 9,194,843 B2* | 11/2015 | Newman | F03D 17/00 |
| 9,459,179 B2* | 10/2016 | Brenner | G01H 1/003 |
| 9,581,138 B2* | 2/2017 | Wakasa | H02J 3/386 |
| 2007/0140847 A1* | 6/2007 | Martinez De Lizarduy Romo ... | F03D 80/50 416/11 |
| 2008/0206052 A1* | 8/2008 | Volkmer | F03D 17/00 416/61 |
| 2010/0082276 A1 | 4/2010 | Becker | |
| 2012/0065901 A1* | 3/2012 | Bechhoefer | F03D 7/047 702/34 |
| 2015/0000404 A1* | 1/2015 | Brenner | F03D 17/00 73/579 |
| 2015/0052985 A1 | 2/2015 | Brenner et al. | |

OTHER PUBLICATIONS

Walford, C. et al. (Dec. 6, 2006). "Condition Monitoring of Wind Turbines," *Technology Overview, Seeded-Fault Testing, and Cost-Benefit Analysis Technical Report*, Electric Power Research Institute, 96 pages.

Renaudin, L. et al. (2010). "Natural Roller Bearing Fault Detection by Angular Measurement of Ture Instantaneous Angular Speed," *Proceedings of ISMA2010 Including USD2010 appearing in MSSP* 24(7): 2949-2964.

* cited by examiner

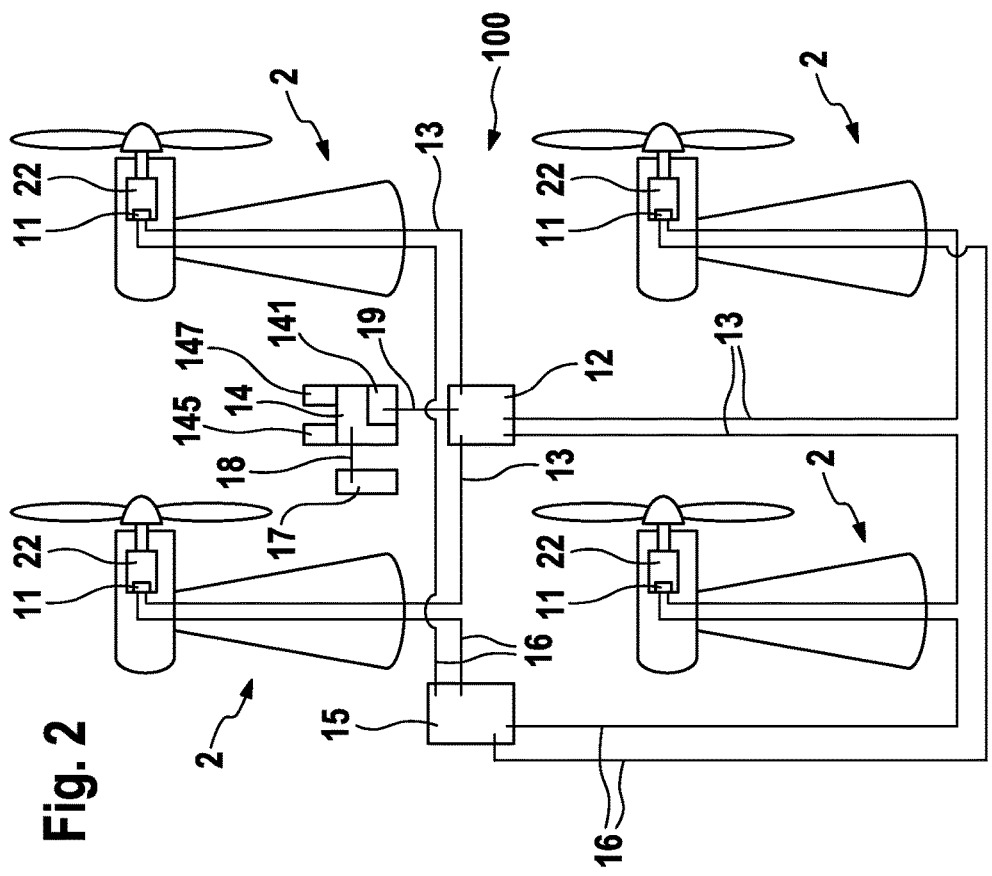
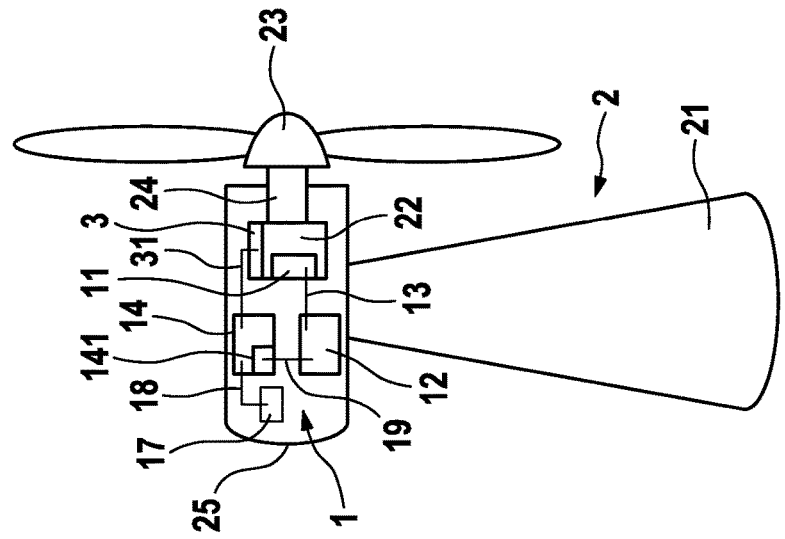

WIND TURBINE DIAGNOSTIC DEVICE FOR GENERATOR COMPONENTS

REFERENCE TO RELATED APPLICATION

This application claims priority to German application no. 10 2014 207 612.9, filed Apr. 23, 2014, the entire contents of which is incorporated herein by reference.

FIELD OF THE INVENTION

The invention relates to a wind turbine diagnostic device for diagnosing mechanical damage to generator components of a wind turbine.

BACKGROUND OF THE INVENTION

The components of a generator of a wind turbine are subjected to strong mechanical loads, which can bring about damage to the generator components. If these damaged generator components are not exchanged, consequential damage may occur, involving high costs to repair. It is therefore necessary to find out about damaged generator components as early as possible, in order to exchange them before sequential damage occurs. The damaged generator components cause vibrations, which are manifested by fluctuations in the rotational speed of the generator. These vibrations can be sensed for example at the generator bearings.

Known wind turbine diagnostic devices comprise vibration sensors at the generator bearings. Owing to the restricted possibilities for positioning the vibration sensors on the generator bearings, these sensors primarily sense radial vibrations. Axial vibrations are sensed only partially or not at all. Consequently, known vibration sensors only offer limited possibilities for diagnosis with respect to mechanical damage caused by axial vibrations.

SUMMARY OF THE INVENTION

An object of the invention is to provide an improved wind turbine diagnostic device that increases the possibility of predicting mechanical damage to generator components caused by vibrations.

This can be achieved by a wind turbine diagnostic device and a method as broadly described herein. Advantageous developments are described in the detailed embodiments below.

With respect to a wind turbine diagnostic device for diagnosing mechanical damage to generator components of at least one wind turbine, comprising at least one speed sensor for determining a variation over time of the rotational speed of a generator of a wind turbine, the speed sensor having at least one speed signal output for outputting the determined variation over time of the rotational speed, it is provided according to the invention that the wind turbine diagnostic device has a frequency analysis module with at least one speed signal input, which is connected to the speed signal output by way of a speed signal line, and a frequency spectrum signal output for outputting a frequency spectrum, the frequency analysis module being designed for determining a frequency spectrum from the determined variation over time of the rotational speed; and has a comparator element, which has a frequency spectrum signal input, which is connected to the frequency spectrum signal output by way of a frequency spectrum signal line, the comparator element being designed for comparing a frequency spectrum with a prescribed standard frequency spectrum and for diagnosing mechanical damage to generator components on the basis of the comparison.

First of all, a number of terms should be explained in more detail:

A signal line is understood as meaning a physical signal line and a radio signal line. The physical signal line may consequently consist for example of a copper cable, a glass fiber cable or a metal rail. The radio signal line may for example consist of a secure radio link.

A variation over time of the rotational speed is understood as meaning a multiplicity of continually determined speed values. The time interval between the individual values to be determined may in this case be chosen arbitrarily. Small time intervals bring about a higher temporal resolution, and consequently a more accurate frequency analysis.

A frequency analysis module is understood as meaning a module that determines the underlying frequencies from a speed signal or a vibration signal. The frequency analysis module may be for example a fast Fourier transform module, which carries out a Fourier transform on the vibration by means of fast algorithms.

An aspect of the invention is based on the combination of two findings, to be specific that on the one hand damaged generator components generate axial vibrations at the generator and on the other hand these axial vibrations lead to fluctuations in the rotational speed of the generator. The rotational speed is in this case continually determined by speed sensors provided as standard in wind turbines, such as for example the incremental sensors of the converters. The frequencies underlying the fluctuations in the rotational speed can be determined by means of a frequency analysis of the rotational speed determined during a specific time period. For this purpose, a variation over time of the rotational speed is transmitted from the speed sensor to the frequency analysis module. The frequency analysis module determines from the transmitted variation over time of the rotational speed the frequencies underlying the fluctuations together with their amplitudes. The frequency spectrum resulting from the frequency analysis comprises a great band width of multiples of the rotational speed with different amplitudes. The resulting frequency spectrum is transmitted on to the comparator element. The comparator element has a standard frequency spectrum, which corresponds to a spectrum in which no vibrations caused by damaged generator components occur. By the comparison, the comparator element determines the frequencies and the amplitudes of the vibrations that deviate from the standard frequency spectrum. The comparator element is designed for the purpose of making a diagnosis with respect to mechanically damaged generator components on the basis of these frequencies and the amplitudes. Although only a rotational movement is in fact recorded by the frequency spectra formed from the rotational speed, surprisingly axial vibrations are also contained in said broad-band frequency spectrum. They can be sensed and classified by comparison with the standard frequency spectrum.

In this way, the invention allows an earlier diagnosis of instances of mechanical damage to the generator components.

Furthermore, the vibrations occurring are independent of the rotational speed of the generator. The vibrations occur at low speeds and at high speeds. Consequently, the frequency analysis can be carried out at any time, and the result thereof is invariant with respect to changes in rotational speed. Furthermore, this means that the result of the frequency analysis can be implemented even when there are highly variable wind conditions, which induce great changes in the rotational speed.

The frequency analysis module can be designed as a fast Fourier transform module (FFT module), that is to say that the frequency analysis module carries out the frequency analysis by means of a fast Fourier transform. Using the FFT for the creation of the frequency spectra allows the Fourier transform of the rotational speed to be carried out very quickly. Consequently, the mechanical state of the generator components can be constantly monitored, and so an early check can be carried out when there is any anomalous vibrational behavior. This allows an exchange of damaged generator components that can be planned at an early time, before serious mechanical damage occurs. As a result, lengthy downtimes of the generator are avoided, and so the downtime costs are reduced.

The wind turbine diagnostic device expediently has a selector with at least one control signal output, which is designed for selecting a speed sensor from the speed sensors of multiple wind turbines and is designed for activating the speed sensor for outputting the data, the speed sensor being designed for outputting the determined variation over time of the rotational speed by way of the speed signal output in response to the activation by the selector. By means of the selector, a specifically selective diagnosis of a specific wind turbine from a multiplicity of wind turbines can be carried out. In this way, the diagnosis of an entire wind farm can be performed with only one frequency analysis module and one comparator element.

The comparator element advantageously comprises a difference module, which is designed for determining the difference between the frequency spectrum and the standard frequency spectrum. By means of the difference module, the determination of the deviations between the frequency spectrum and the standard frequency spectrum can be carried out efficiently. This further speeds up the determination of instances of damage to the generator components.

The comparator element advantageously comprises a fault signal output, the comparator element being designed for outputting a fault signal by means of the fault signal output when the deviation between the frequency spectrum and the prescribed standard frequency spectrum exceeds a predetermined limit value, the fault signal comprising a reference to the generator components to be monitored. This enables the comparator element to pass on to an electronic data processing the damaged generator components to be monitored.

For this purpose, a fault module with a fault signal input may be expediently provided, the fault signal input being connected to the fault signal output by way of a fault signal line and the fault module being designed for reporting the generator components to be monitored on the basis of the diagnostic signal. The fault module may in this case advantageously comprise a screen, on which the generator components to be monitored can be marked or indicated.

Furthermore, the generator component is advantageously a slip ring of a generator. Instances of damage to the slip rings of the generators bring about very serious consequential damage, and so an exchange of damaged slip rings in good time brings about a great saving in costs.

It is also expedient if the comparator element comprises an imbalance module, which is designed for detecting imbalances in the generator components. The early detection of imbalances allows the generator components to be monitored in a specifically selective manner, and so consequential damage, which may also comprise damage to the slip rings, is avoided.

The comparator element expediently has a harmonic module, which is designed for carrying out the comparison on the basis of the multiples of the rotational speed in the frequency spectrum and can comprise an input for ordering the harmonics to be monitored. It has been found that most instances of damage cause vibrations that are multiples of the rotational speed. Consequently, the comparison can be carried out even more quickly.

A vibration sensor for measuring vibrations at generator bearings with a vibration signal output is advantageously provided, the comparator element comprising a vibration signal input, which is connected to the vibration signal output by way of a vibration signal line, the comparator element being designed for taking the vibration signal into account in the diagnosis. Consequently, the comparator element and the vibration sensor interact in such a way that the primarily radial vibrations at the generator bearings can be brought together with the vibrations determined from the frequency spectrum in the diagnosis with respect to damaged generator components. In this way, the accuracy of the diagnosis is increased further.

The invention also relates to a generator for a wind turbine that has a wind turbine diagnostic device for diagnosing mechanical damage to generator components of a wind turbine, it being provided according to the invention with respect to the wind turbine diagnostic device comprising a speed sensor for determining a variation over time of the rotational speed of a generator of a wind turbine, the speed sensor having at least one speed signal output for outputting the determined variation over time of the rotational speed, that the wind turbine diagnostic device has a frequency analysis module with at least one speed signal input, which is connected to the speed signal output by way of a speed signal line, and a frequency spectrum signal output for outputting a frequency spectrum, the frequency analysis module being designed for determining a frequency spectrum from the determined variation over time of the rotational speed; and has a comparator element, which has a frequency spectrum signal input, which is connected to the frequency spectrum signal output by way of a frequency spectrum signal line, the comparator element being designed for comparing a frequency spectrum with a prescribed standard frequency spectrum and for diagnosing mechanical damage to generator components on the basis of the comparison.

The wind turbine diagnostic device is in this case integrated in the generator. Consequently, the comparator element of the wind turbine diagnostic device can be made to match the generator ex works, thereby allowing a diagnosis with great accuracy.

The invention also comprises a wind turbine that has a generator and a wind turbine diagnostic device for diagnosing mechanical damage to generator components of a wind turbine, it being provided according to the invention with respect to the wind turbine diagnostic device comprising a speed sensor for determining a variation over time of the rotational speed of a generator of a wind turbine, the speed sensor having at least one speed signal output for outputting the determined variation over time of the rotational speed, that the wind turbine diagnostic device has a frequency analysis module with at least one speed signal input, which is connected to the speed signal output by way of a speed signal line, and a frequency spectrum signal output for outputting a frequency spectrum, the frequency analysis module being designed for determining a frequency spectrum from the determined variation over time of the rotational speed; and has a comparator element, which has a frequency spectrum signal input, which is connected to the frequency spectrum signal output by way of a frequency spectrum signal line, the comparator element being designed for comparing a frequency spectrum with a prescribed standard frequency spectrum and for diagnosing mechanical damage to generator components on the basis of the comparison.

In this alternative of the invention, the wind turbine diagnostic device is provided separately from the generator in the wind turbine. This allows the wind turbine diagnostic device to be retrofitted in an existing wind turbine.

With respect to the developments of the wind turbine diagnostic device on the generator according to the invention and the wind turbine according to the invention, reference is made to the statements made above.

The invention also relates to a method for diagnosing mechanical damage to generator components of a wind turbine, comprising the steps of: determining a time series of the rotational speed of the generator, the following steps being provided according to the invention: determining a frequency spectrum of the rotational speed; comparing the frequency spectrum with a prescribed standard frequency spectrum; and determining mechanical damage to generator components on the basis of the comparison.

The method can be advantageously carried out with a wind turbine diagnostic device described above.

BRIEF DESCRIPTION OF THE DRAWINGS

The invention is explained in more detail on the basis of an exemplary embodiment, which is represented in the drawings, in which:

FIG. 1 shows a schematic representation of a wind turbine with a wind turbine diagnostic device;

FIG. 2 shows a schematic representation of a wind farm with a selector and a wind turbine diagnostic device;

DETAILED DESCRIPTION OF THE INVENTION

Figure 4:
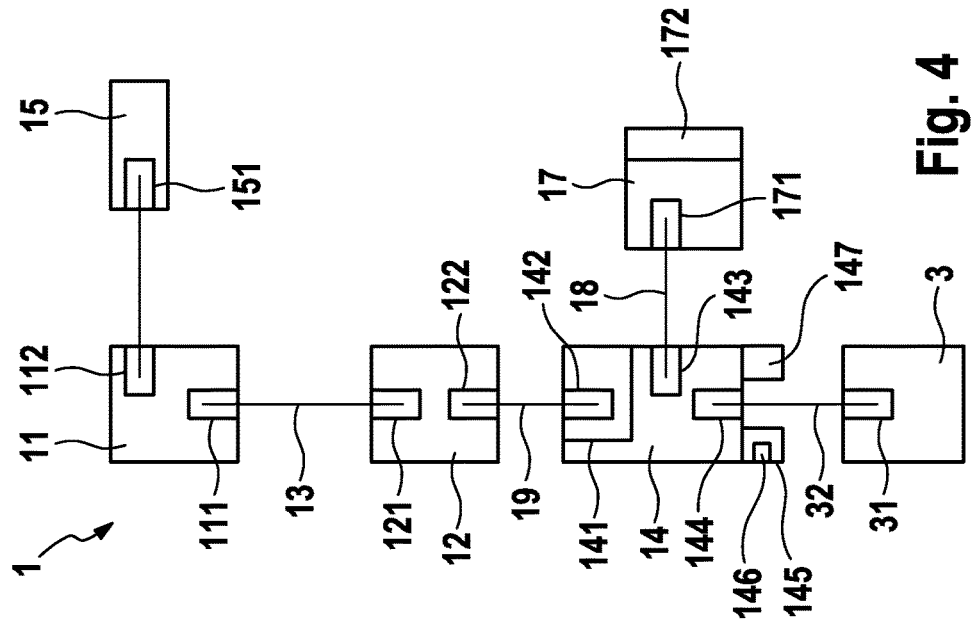
FIG. 4 shows a schematic representation of a wind turbine diagnostic device.

According to FIG. 1, a wind turbine is presented, denoted as a whole by the reference numeral 2 and having a tower 21, a nacelle 25, which is arranged on the tower, a rotor 23, which is rotatably mounted on one end face of the nacelle 25 and is connected to a generator 22 by way of a shaft 24, which may comprise a gear stage (not shown). The generator 22 may be designed as a synchronous or asynchronous generator.

The generator 22 comprises generator components 221, which are exposed to mechanical loads on account of the rotation of the shaft 24. In this exemplary embodiment, the generator component 221 is a slip ring. Also provided on the wind turbine 2 is a wind turbine diagnostic device, which is identified as a whole by the reference numeral 1. The wind turbine diagnostic device 1 comprises a speed sensor 11, which monitors the rotation of the shaft 24 of the generator 21.

The speed sensor 11 is designed to create and store a time series on the basis of the rotational speed. For storage, the speed sensor 11 comprises a memory component 113. The speed sensor also has a speed signal output 111. The wind turbine diagnostic device 1 also comprises a frequency analysis module 12, which comprises at least one speed signal input 121. The speed signal output 111 and the speed signal input 121 are connected to one another by way of a speed signal line 13. The time series determined by the speed sensor 11 on the basis of the rotational speed can be read out from the memory component 113 and transmitted to the frequency analysis module 12 by way of the speed signal output 111 by way of the speed signal line 13 and the speed signal input 121. The frequency analysis module 12 calculates from the time series on the basis of the rotational speed a frequency spectrum in a way known per se by means of a fast Fourier transform.

The wind turbine diagnostic device 1 also has a comparator element 14. The calculated frequency spectrum is transmitted from the frequency analysis module 12 to the comparator element 14. For this purpose, the frequency analysis module 12 has a frequency spectrum signal output 122. The frequency spectrum signal output 122 is connected to a frequency spectrum signal input 142 of the comparator element 14 by way of a frequency spectrum signal line 19.

Figure 5A:
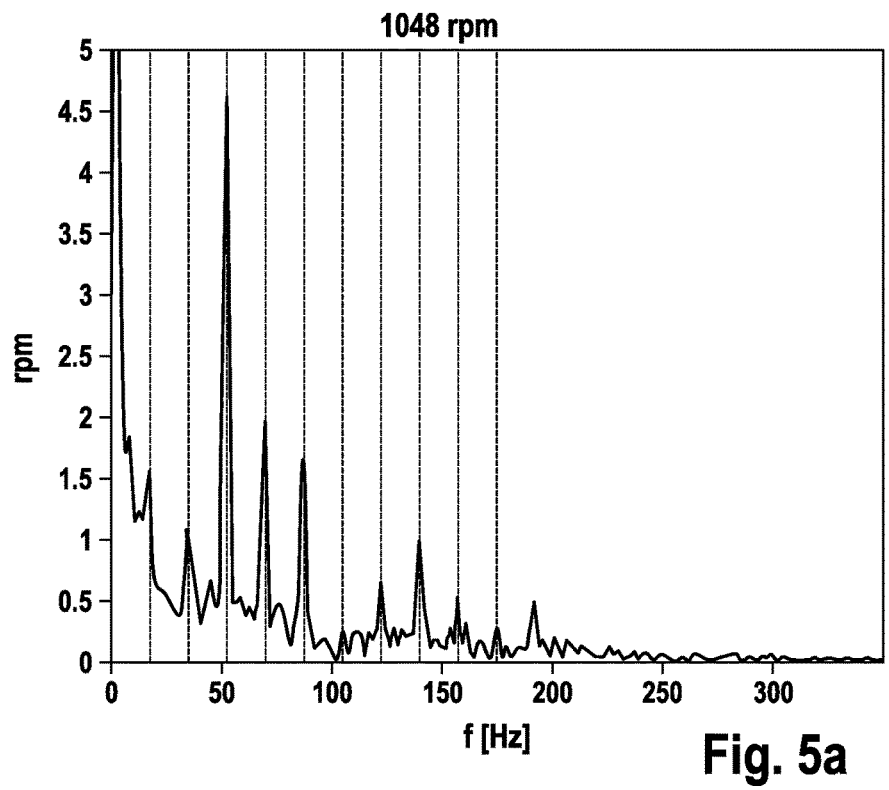
FIGS. 5a and b show a frequency spectrum of a damaged generator component (a) and a renewed generator component (b) of a first wind turbine.

The comparator element 14 has a standard frequency spectrum, which corresponds to the frequency spectrum of an undamaged generator 22. The calculated frequency spectrum transmitted from the frequency analysis module 12 is compared with the standard frequency spectrum by the comparator element 14. FIG. 5a shows a frequency spectrum of a generator 22, which has damaged generator components 221. The rotational speed of the generator 22 was at 1048 revolutions/min (rpm). The speed frequency is marked as a dashed vertical line on the extreme left in the frequency spectrum in FIG. 5a at 1048 rpm/60=17.47 rps (revolutions/s)=17.47 Hz. The further dashed vertical lines in the frequency spectrum to the right of the speed frequency are the multiples of the speed frequency.

Apart from at the speed frequency itself, the frequency spectrum shows clear amplitudes at the $2^{nd}$ to $5^{th}$, $7^{th}$ and $8^{th}$ multiples of the speed frequency. These amplitudes indicate an instance of damage to a generator component 221, in particular the slip ring. A monitoring check on the slip ring led to the exchange of the slip ring.

Figure 5B:
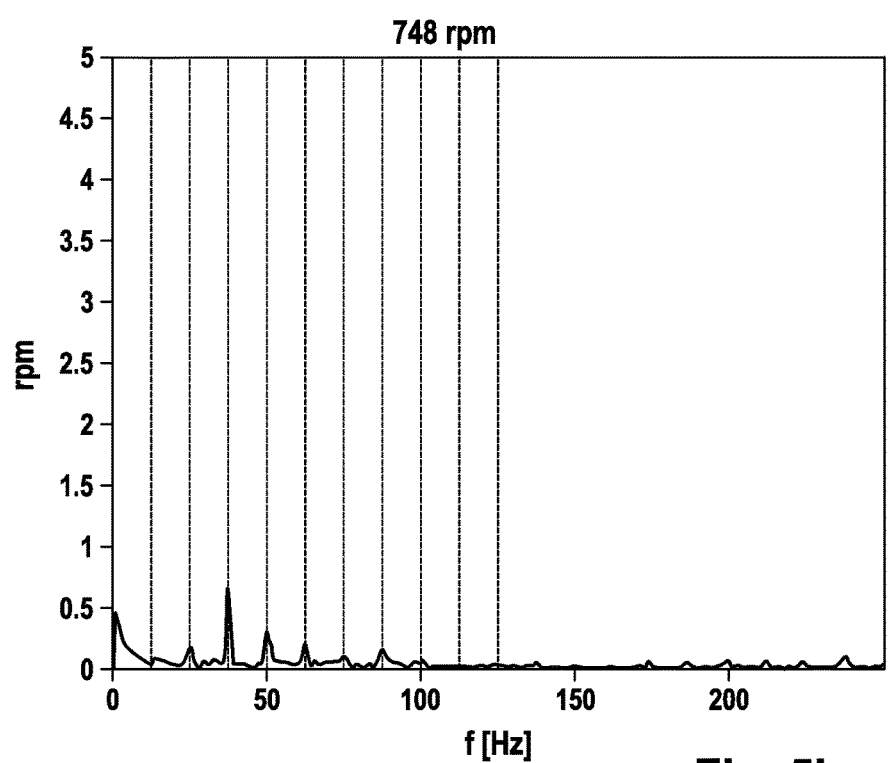
Figure 6A:
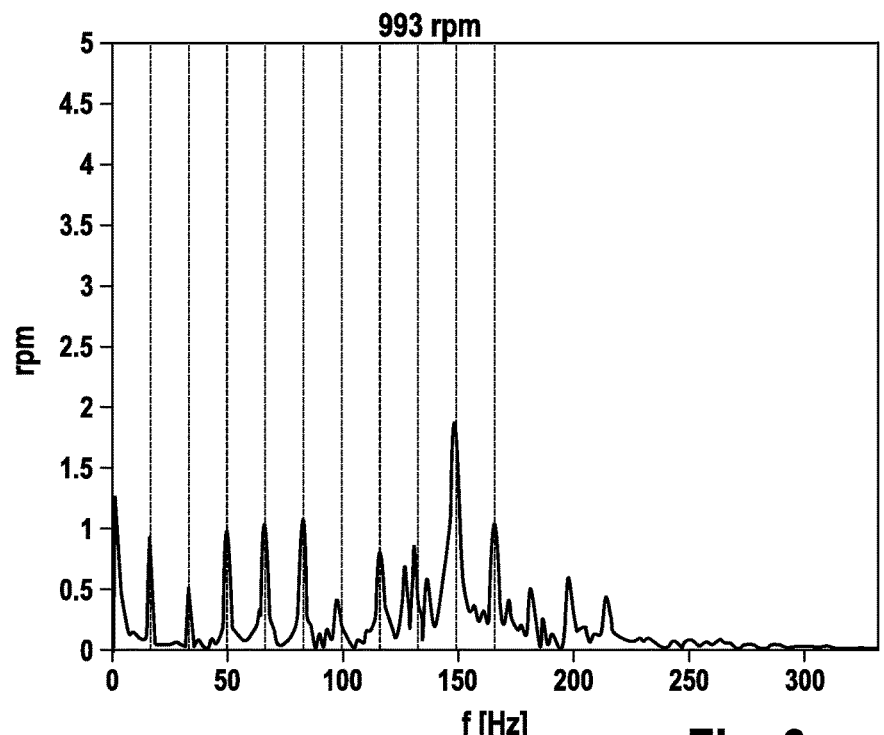
FIGS. 6a and b show a frequency spectrum of a damaged generator component (a) and a renewed generator component (b) of a second wind turbine.
Figure 6B:
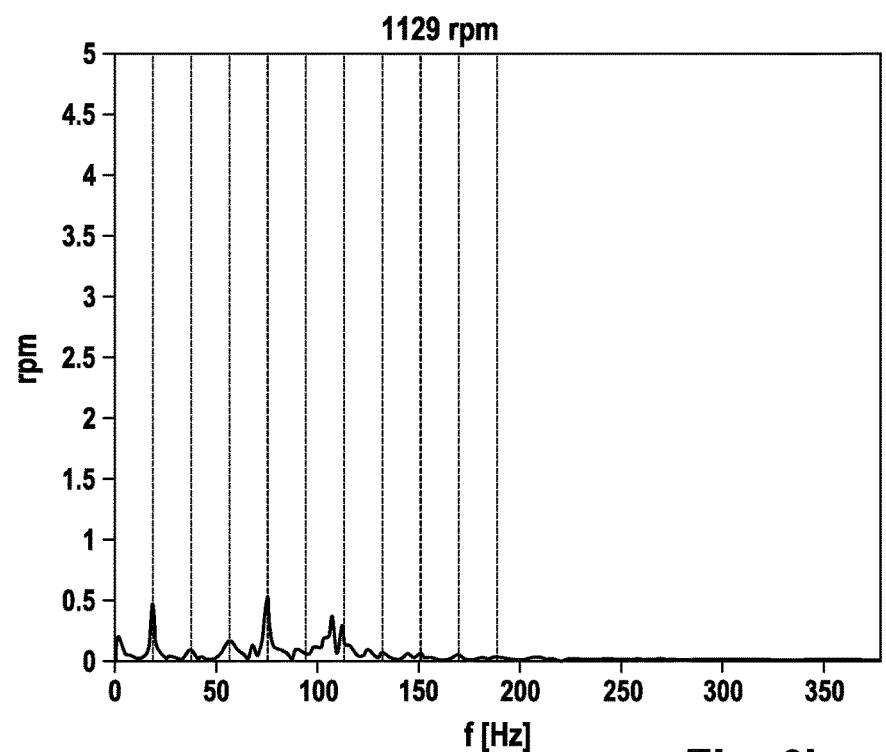

After the exchange of the slip ring, a further diagnosis was carried out, yielding a frequency spectrum according to FIG. 5b. The diagnosis was carried out at a generator speed of 748 revolutions/min. As in FIG. 5a, the speed frequency and the multiples of the speed frequency are depicted in the frequency spectrum as dashed vertical lines. There are clearly evident differences in the amplitudes between the frequency spectrum according to FIG. 5a and the frequency spectrum according to FIG. 5b. There are no longer vibrations that cause great amplitudes at the multiples of the generator speed. All that is left is a small amplitude at the $3^{rd}$ to $5^{th}$ multiples of the speed frequency. These amplitudes indicate imbalances in further generator components 221. In FIGS. 6a and 6b, a further example of a frequency spectrum is presented, determined before (FIG. 6a) and after (FIG. 6b) the exchange of a slip ring. Here, too, there are clearly evident differences between the frequency spectrum before the exchange and the frequency spectrum after the exchange.

The remaining amplitudes in FIG. 6b once again indicate imbalances in further generator components 221.

To facilitate and speed up the comparison, the comparator element 14 has a difference module 141, which determines the difference between the calculated frequency spectrum and the standard frequency spectrum. The comparator element 14 can quickly detect damaged generator components 221 by means of the difference between the calculated frequency spectrum and the standard frequency spectrum.

For the detection of imbalances, the comparator element 14 has an imbalance module 147. The imbalance module 147 is designed for determining imbalances in the generator components 221 from the frequency spectrum.

The comparator element 14 also has a harmonic module 145, which carries out the comparison on the basis of the multiples of the rotational speed of the generator. The harmonic module 145 has for this purpose an input 146 for the ordering of the harmonics to be monitored. By means of the input 146, the harmonic module 145 can be set for evaluating specific harmonics in the frequency spectrum. This allows a more accurate analysis.

The wind turbine diagnostic device 1 also comprises a fault module 17, which reports the damage to generator components 221. For this purpose, the fault module has a fault signal input 171, which is connected to a fault signal output 143 of the comparator element 14 by way of a fault signal line 18. The comparator element 14 transmits to the fault module 17 by way of a fault signal line 18 a list of the generator components 221 that have an instance of damage according to the diagnosis carried out. The fault module 17 marks the generator components 221 that have been reported as damaged by the comparator element 14. For this purpose, the fault module 17 has a monitor 172, which outputs a list of the damaged generator components 221. Alternatively, the monitor 172 may depict a graphic representation of the generator components 221 and graphically mark the damaged generator components 221.

The wind turbine diagnostic device 1 also has a vibration sensor 3, which picks up vibrations at the generator bearing. The vibration sensor 3 is positioned radially from the axis of the generator 22. Consequently, the vibration sensor 3 principally picks up radial vibrations of the generator 22. The vibration sensor 3 comprises a vibration signal output 32, which is connected to a vibration signal input 144 at the comparator element 14 by way of a vibration signal line 31. The vibration sensor 3 transmits the frequency and the amplitude of the radial vibrations to the comparator element 14 by way of the vibration signal line 31. The comparator element 14 uses the data transmitted from the vibration sensor 3 with respect to the frequency and amplitude of the radial vibrations in order to increase the accuracy of the diagnosis with respect to the damaged generator components 221. Thus, for example, when radial vibrations occur in the generator bearings, and at the same time anomalies in the frequency spectrum of the rotational speed, a slip ring defect can be dependably diagnosed.

The wind turbine diagnostic device 1 also has a selector 15, which comprises at least one control signal output 151. The control signal output 151 is connected to a control signal input 112 at the speed sensor 11 by way of a control signal line 16. The speed sensor 11 is in this case designed in such a way that it outputs the determined time series on the basis of the rotational speed to the comparator element 14 when the selector 15 transmits a control signal. The selector 15 may in this case be connected to a multiplicity of speed sensors 11 of different wind turbines 2, which are grouped together to form a wind farm 100. In this case, each speed sensor 11 has a control signal input 112, which is connected to one of the control signal outputs 151 of the selector 15 by way of a separate control signal line 16. The selector can consequently activate the speed sensors 11 of different wind turbines 2 separately. Consequently, different wind turbines 2 can be subjected to a diagnosis at different points in time. In an embodiment that is an alternative to that described above, the frequency analysis module 12 also has multiple speed signal inputs 121. The speed signal inputs 121 are connected to the speed signal outputs 111 of the aforementioned speed sensors 11 of different wind turbines 2 of a wind farm 100. The frequency analysis module 12 thereby respectively receives a time series on the basis of the rotational speed of a specific wind turbine 2, the speed sensor 11 of which has been activated by the selector 15. Consequently, only one wind turbine diagnostic device 1 with multiple speed sensors 11 is required for multiple wind turbines 2. Only a single frequency analysis module 12, a single comparator element 14 and a single fault module 17 are necessary to check the entire wind farm 100.

The signal lines 13, 16, 18, 31 may also be designed as radio links. This avoids complex assembly work for the signal lines.

Figure 3:
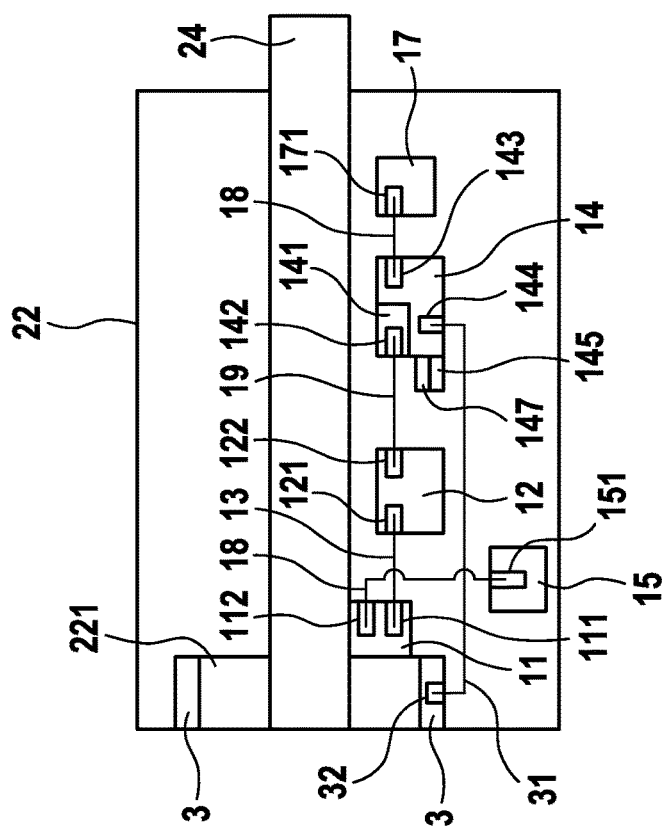
FIG. 3 shows a schematic representation of a generator with a wind turbine diagnostic device.

In a further alternative embodiment according to FIG. 3, the wind turbine diagnostic device 1 may be completely integrated in a generator 22. In this case, the speed sensor 11, the frequency analysis module 12, the comparator element 14 and the fault module 17 are integrated in the generator 23. A control element 15 may also be provided. Consequently, the generator 22 of a wind turbine 2 may comprise a complete wind turbine diagnostic device 1, the wind turbine diagnostic device 1 being used for the entire wind farm 100 in which the wind turbine 2 is positioned. By means of the inventive generator 22, a wind farm 100 can be equipped with a wind turbine diagnostic device 1 in an easy way.

The method according to the invention for diagnosing mechanical damage to generator components of a wind turbine is performed by the following steps:

Firstly the rotational speed of the generator 22 is determined, in that for example an incremental sensor of a converter of a wind turbine 2 is read out. In this way, a time series on the basis of the rotational speed is determined. In a further step, the frequency spectrum of the rotational speed is determined from the time series on the basis of the rotational speed. A fast Fourier transform may be used for this. Alternatively, recourse may be made to a conventional Fourier transform. The determined frequency spectrum of the rotational speed is analyzed and compared with a prescribed standard frequency spectrum. The standard frequency spectrum is in this case a frequency spectrum of a wind turbine 2 that has no damaged generator components 221. In a final step, damaged generator components 221 are determined on the basis of the comparison. In the comparison, the deviations between the calculated frequency spectrum and the standard frequency spectrum are determined and conclusions as to the possible causes of the additional vibrations are reached on the basis of these deviations. Consequently, damage to the generator components 221 can be dependably diagnosed.

In a first preferred embodiment, the method may be carried out by means of the wind turbine diagnostic device 1 described above. Alternatively, however, the method may also be carried out without the wind turbine diagnostic device 1. For this purpose, the time series on the basis of the rotational speed is read out manually and a manual analysis of the frequency spectra is carried out on the basis of a Fourier transform.

The invention claimed is:

1. A wind turbine diagnostic device for diagnosing mechanical damage to one or more generator components of at least one wind turbine, comprising:
   at least one speed sensor for determining a rotational speed of a generator of the at least one wind turbine, the speed sensor having at least one speed signal output for outputting the determined rotational speed;
   a frequency analysis module with at least one speed signal input connected to the speed signal output by a speed signal line, and a frequency spectrum signal output for outputting a frequency spectrum, the frequency analysis module being configured to determine a frequency spectrum of the rotational speed; and
   a comparator having a frequency spectrum signal input connected to the frequency spectrum signal output by a frequency spectrum signal line, the comparator being configured to compare the frequency spectrum of the rotational speed with a prescribed standard frequency spectrum and to diagnose mechanical damage to the one or more generator components based on the comparison.

2. The wind turbine diagnostic device of claim 1, wherein the frequency analysis module is configured to carry out a frequency analysis by a fast Fourier transform.

3. The wind turbine diagnostic device of claim 1, comprising a selector with at least one control signal output and being configured to select a speed sensor from the speed sensors of multiple wind turbines and to activate the speed sensor for outputting the data, the speed sensor being configured to output the determined rotational speed by the speed signal output in response to the activation by the selector.

4. The wind turbine diagnostic device of claim 1, wherein the comparator has a difference module configured to determine the difference between the frequency spectrum and the standard frequency spectrum.

5. The wind turbine diagnostic device of claim 1, wherein the comparator has a fault signal output, the comparator being configured to output a fault signal by the fault signal output when the deviation between the frequency spectrum and the prescribed standard frequency spectrum exceeds a predetermined limit value, the fault signal comprising a reference to the one or more generator components to be monitored.

6. The wind turbine diagnostic device of claim 5, comprising a fault module with a fault signal input, the fault signal input being connected to the fault signal output by a fault signal line and the fault module being configured to report the one or more generator components to be monitored based on the fault signal.

7. The wind turbine diagnostic device of 1, wherein the one or more generator components comprise a slip ring of the generator.

8. The wind turbine diagnostic device of claim 1, wherein the comparator comprises an imbalance module configured to detect imbalances in the one or more generator components.

9. The wind turbine diagnostic device of claim 1, wherein the comparator has a harmonic module configured to carry out the comparison based on multiples of the rotational speed in the frequency spectrum.

10. The wind turbine diagnostic device of claim 9, wherein the harmonic module comprises an input for ordering the harmonics to be monitored.

11. The wind turbine diagnostic device of claim 1, comprising a vibration sensor for measuring vibrations at generator bearings, the vibration sensor having a vibration signal output, the comparator comprising a vibration signal input connected to the vibration signal output by a vibration signal line, the comparator being configured to classify the vibration signal for correlating evaluation of the rotational speed with respect to the classified vibration signal and for taking the correlating evaluation into account in the diagnosis.

12. A generator for a wind turbine comprising:
   a wind turbine diagnostic device for diagnosing mechanical damage to one or more generator components of at least one wind turbine, the wind turbine diagnostic device comprising
      at least one speed sensor for determining a rotational speed of a generator of the at least one wind turbine, the speed sensor having at least one speed signal output for outputting the determined rotational speed,
      a frequency analysis module with at least one speed signal input connected to the speed signal output by a speed signal line, and a frequency spectrum signal output for outputting a frequency spectrum, the frequency analysis module being configured to determine a frequency spectrum from the determined rotational speed, and
      a comparator having a frequency spectrum signal input connected to the frequency spectrum signal output by a frequency spectrum signal line, the comparator being configured to compare a frequency spectrum with a prescribed standard frequency spectrum and to diagnose mechanical damage to the one or more generator components based on the comparison.

13. The generator of claim 12, wherein the frequency analysis module is configured to carry out a frequency analysis by a fast Fourier transform.

14. A wind turbine comprising:
   a generator; and
   a wind turbine diagnostic device for diagnosing mechanical damage to one or more generator components of at least one wind turbine, the wind turbine diagnostic device comprising
      at least one speed sensor for determining a a rotational speed of a generator of the at least one wind turbine, the speed sensor having at least one speed signal output for outputting the determined rotational speed,
      a frequency analysis module with at least one speed signal input connected to the speed signal output by a speed signal line, and a frequency spectrum signal output for outputting a frequency spectrum, the frequency analysis module being configured to determine a frequency spectrum from the determined rotational speed, and
      a comparator having a frequency spectrum signal input connected to the frequency spectrum signal output by a frequency spectrum signal line, the comparator being configured to compare a frequency spectrum with a prescribed standard frequency spectrum and to diagnose mechanical damage to the one or more generator components on the basis of the comparison.

15. The wind turbine of claim 14, wherein the frequency analysis module is configured to carry out a frequency analysis by a fast Fourier transform.

16. A method of diagnosing mechanical damage to one or more generator components of a wind turbine, comprising:
   determining a time series of a rotational speed of a generator of the wind turbine comprising determining a frequency spectrum of the rotational speed of the generator;
   comparing the frequency spectrum of the rotational speed of the generator with a prescribed standard frequency spectrum; and determining mechanical damage to the one or more generator components based on the comparison.

17. The method of claim 16, wherein the method is carried out by a wind turbine diagnostic device of that includes:
- at least one speed sensor for determining the rotational speed of the generator, the speed sensor having at least one speed signal output for outputting the determined rotational speed,
- a frequency analysis module with at least one speed signal input connected to the at least one speed signal output by a speed signal line, and a frequency spectrum signal output for outputting a frequency spectrum, the frequency analysis module being configured to determine a frequency spectrum of the rotational speed, and
- a comparator having a frequency spectrum signal input connected to the frequency spectrum signal output by a frequency spectrum signal line, the comparator being configured to compare the frequency spectrum of the rotational speed with a prescribed standard frequency spectrum and to diagnose mechanical damage to the one or more generator components based on the comparison.

* * * * *